C. A. TOLMAN.
JAR OPENER.
APPLICATION FILED MAR. 17, 1909.
934,237.
Patented Sept. 14, 1909.
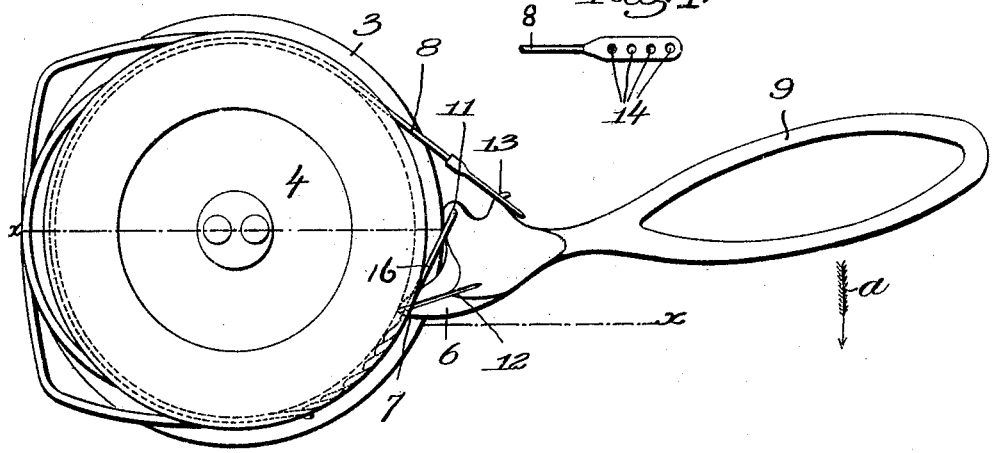
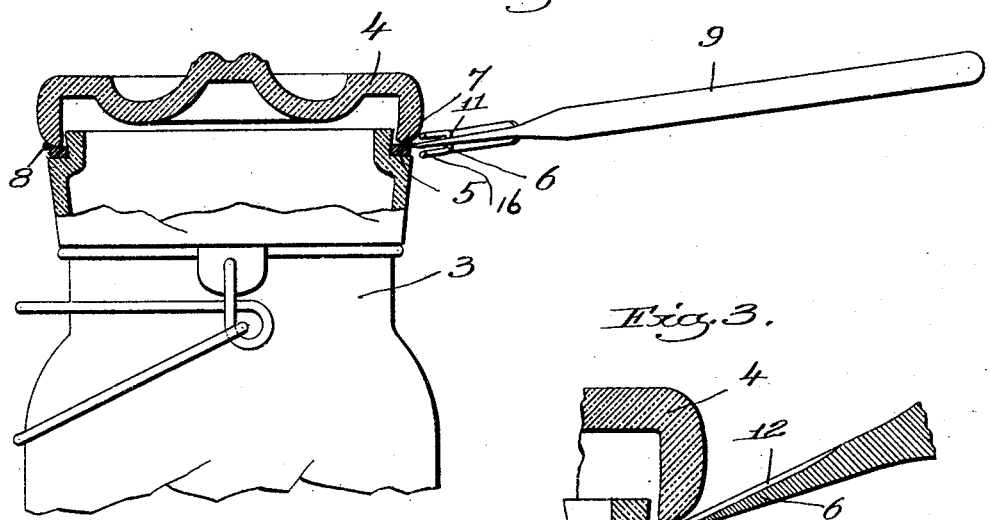
Witnesses:
Fred S. Greenleaf.
Joseph M. Ward.
Inventor.
Charles A. Tolman,
by

UNITED STATES PATENT OFFICE.

CHARLES A. TOLMAN, OF GREENLAND, NEW HAMPSHIRE.

JAR-OPENER.

934,237.	Specification of Letters Patent.	Patented Sept. 14, 1909.

Application filed March 17, 1909. Serial No. 483,943.

*To all whom it may concern:*

Be it known that I, CHARLES A. TOLMAN, a citizen of the United States, residing at Greenland, county of Rockingham, State of New Hampshire, have invented an Improvement in Jar-Openers, of which the following description, in connection with the accompanying drawing, is a specification, like numerals on the drawing representing like parts.

This invention relates to a novel device for opening fruit jars.

The so-called "Lightening" fruit jars are provided with a cap which rests on a gasket around the neck of the jar, and the cap is held in place by a bail arrangement. In order to remove the cap from a jar of this type it is necessary to insert some implement, such as a knife blade, between the edge of the cap and the gasket so as to pry up the cap and admit sufficient air beneath the same to break the vacuum. As soon as the vacuum is broken the cap can be readily removed. It is quite difficult to thus break the vacuum with an ordinary implement such as a can opener or knife blade without danger of the implement slipping and injuring the party using it.

The object of my invention is to provide a novel device by which the cap of a "Lightening" or similar jar can be readily removed without any danger to the person removing it.

An implement embodying my invention comprises an opening point adapted to enter between the jar cap and the gasket, means to engage the jar on the opposite side from that at which the opening point is situated, and means preferably in the form of a handle which by its movement relative to the jar causes the point to enter beneath the cap and lift the cap sufficiently to break the vacuum. I will preferably provide the opening point with a groove which facilitates the entrance of air beneath the cap.

Figure 1 is a plan view of a jar showing one form of my improved jar opener applied thereto; Fig. 2 is a section on the line $x$—$x$, Fig. 1; Fig. 3 is an enlarged sectional view of the edge of the jar and cap showing the manner in which my invention operates; Fig. 4 is a detail of one end of the holder shown in Fig. 1.

3 designates an ordinary "Lightening" jar having the usual cap 4 and the gasket 5 on which the cap rests. My invention embodies an opening point adapted to be inserted between the cap 4 and the gasket 5, a holding device adapted to embrace the jar and hold the point in position to operate, and a handle which by its movement forces the point beneath the cap sufficiently to admit of air to break the vacuum.

My improved device comprises a handle 9 having formed at one end thereof an opening point 6 provided with a sharpened or pointed end 7, and a holder 8 which is adapted to encircle the neck of the jar and the ends of which are pivoted to the handle at two different places 11 and 13 at one side of the opening point. The holder may conveniently be made of wire although this is not essential to the invention. The two points 11 and 13 are different distances from the end of the handle, and as a result when the end of the handle is swung into the direction of the arrow $a$, Fig. 1, the point 6 will be forced between the jar cap 4 and the gasket.

The end of the holder which is pivoted to the handle at 11 is provided with an elongated loop 16 through which the point 6 enters as the handle is swung in the direction of the arrow $a$, Fig. 1, and this loop 16 constitutes a guiding loop which serves to guide and steady the point 6 as the device is operated. Where the holder is made of wire, it will preferably be placed on the neck of the jar, as shown in Fig. 2, that is, immediately above the gasket, and as soon as the handle is turned, the pressure on the wire will tend to draw it into the space between the cap and the gasket and will hold it in position. The loop 16 will, therefore, be properly positioned so that as the point 6 enters it, said point will be directed into the space between the gasket and the cap, as clearly seen in Fig. 3. The loop 16 is permanently secured to the handle, but the other end of the holder is detachably secured to the handle, this being accomplished by making the handle with the hook or projection 13 and providing the end of the holder 8 with an aperture 14 adapted to set over said hook. If desired, I may make the end of the holder with a plurality of apertures so that the device may be used with jars of different sizes. The opening point 6 is provided on its upper face with an air groove which facilitates the entrance of air beneath the cap as the extremity 7 of the point crowds its way inward. This furnishes an easy means to break the vacuum under the cap and greatly facilitates the removal of the cap.

In using the device the end of the holder will be disconnected from the projection 13 and placed around the cap and will then be hooked onto the projection 13, as seen in Fig. 1. Thereafter the handle 9 will be turned in the direction of the arrow, thus forcing the opening point between the jar and the gasket and loosening the cap. The point 6 is preferably curved upwardly on its under side, as clearly seen in Fig. 3, so that the extremity of the point will slide over the gasket and will not tend to cut into the gasket.

Having fully described my invention, what I claim as new and desire to secure by Letters Patent is:—

1. In a jar opener, the combination with a handle having at one end an opening point, of a holder adapted to encircle the neck of a jar and having both ends pivoted to said handle at different points on the same side of the opening point, one end of the holder having formed therein an elongated point-guiding loop through which the opening point enters and by which it is guided as the device is operated to open a jar.

2. In a jar opener, the combination with a handle having at one end an opening point, of a holder adapted to encircle the neck of a jar and having both ends pivoted to the handle at different points on the same side of the opening point, said opening point having an air groove formed on its upper surface.

3. In a jar opener, the combination with a handle having at one end an opening point, of a holder adapted to encircle the neck of a jar and having both ends pivoted to said handle at different points on the same side of the opening point, one end of the holder having formed therein an elongated point-guiding loop through which the opening point enters and by which it is guided as the device is operated to open a jar, the extremity of said opening point being curved upwardly or beveled on its under side.

4. In a jar opener, the combination with a handle having at one end an opening point and a hooked projection extending from the edge thereof at one side of said point, of a holder adapted to encircle the neck of a jar and permanently pivoted to the handle at one end and provided with a plurality of apertures at the other end any one of which may be placed over the hooked projection.

In testimony whereof, I have signed my name to this specification, in the presence of two subscribing witnesses.

CHARLES A. TOLMAN.

Witnesses:
 GEORGE T. HUGHES,
 FLAGG F. GRANT.